May 5, 1970  A. M. FERNANDES  3,509,633
CUTTING GUIDE
Filed April 22, 1968
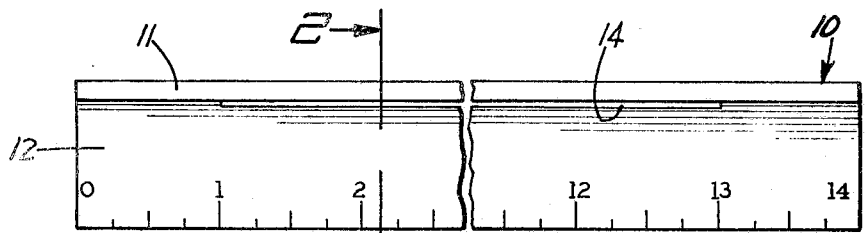
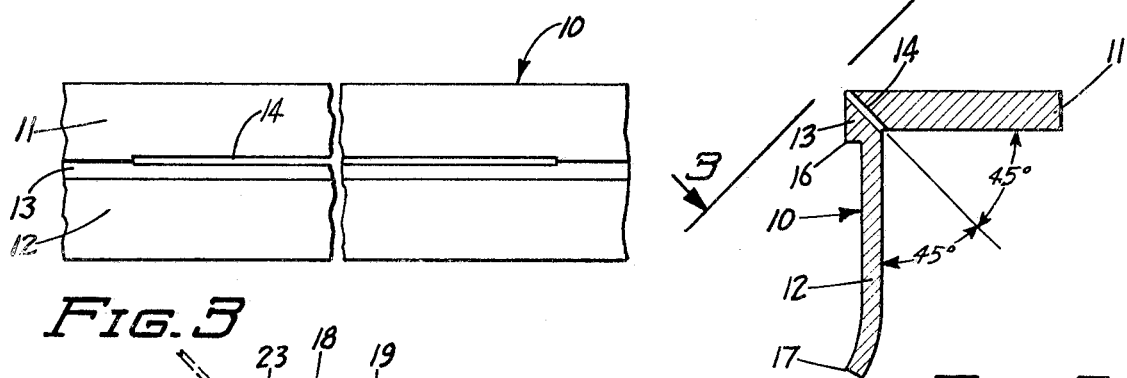
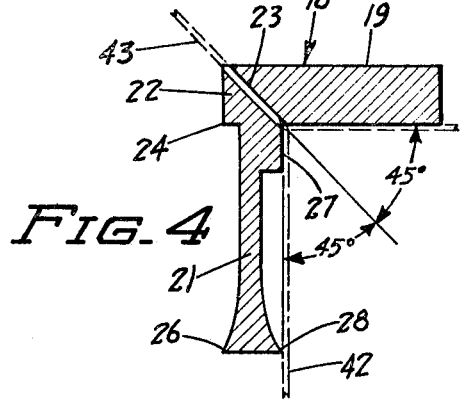
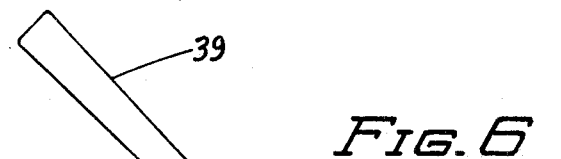
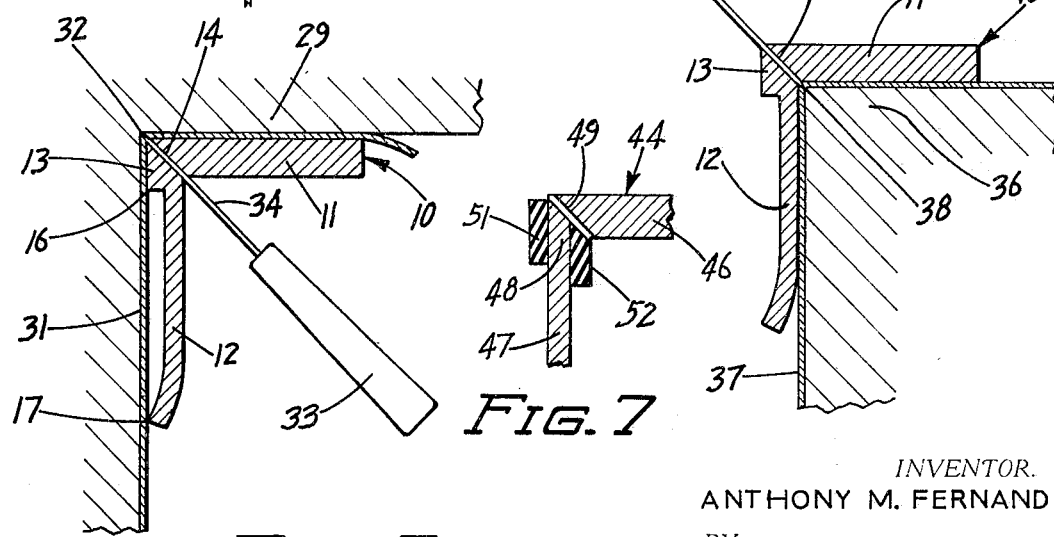
INVENTOR.
ANTHONY M. FERNANDES
BY Burd, MacEachron, Braddock,
Bartz & Schwartz
ATTORNEYS 3,509,633
CUTTING GUIDE
Anthony M. Fernandes, 7207 Morgan Ave. N.,
Minneapolis, Minn. 55430
Filed Apr. 22, 1968, Ser. No. 723,096
Int. Cl. B431 7/00
U.S. Cl. 33—174        11 Claims

ABSTRACT OF THE DISCLOSURE

A wall paper cutting guide for directing a cutting edge longitudinally along the corner of a wall to cut the wallpaper along the corner. The guide is an angle member having a longitudinal slot along the corner forming a guideway for the knife. Longitudinal ribs extended along the corner section of the angle member adjacent the slot subjects the wall paper adjacent the corner to pressure so that the knife will accurately cut the wall paper.

SUMMARY OF INVENTION

The invention relates to a guide for a cutting tool having a knife used to cut sheet material along a corner of a structure. The guide comprises an elongated angle member having a guide flange and a holding flange angularly disposed with respect to each other. The adjacent sides of the flanges are connected with a corner section having an elongated longitudinal slot. When the angle member is placed longitudinally on the corner of the structure the slot extends longitudinally of the corner. When the knife is inserted into the slot and moved longitudinally the sheet material is accurately cut along the corner. The slot serves as a guideway for the knife. The cutting guide is usuable to cut the sheet material on both inside and outside corners.

IN THE DRAWINGS

FIGURE 1 is a foreshortened plan view of the inside of the cutting guide of the invention;

FIGURE 2 is an enlarged sectional view taken along the line 2—2 of FIGURE 1;

FIGURE 3 is a foreshortened plan view of the outside of the cutting guide looking along the line 3—3 of FIGURE 2;

FIGURE 4 is a view similar to FIGURE 2 of a modified cutting guide;

FIGURE 5 is a sectional view of the cutting guide cooperating with a cutting tool to cut wallpaper on an inside corner;

FIGURE 6 is a sectional view of the wall guide cooperating with a cutting tool to cut wallpaper on an outside corner; and FIGURE 7 is a fragmentary cross sectional view of another modified cutting guide.

Referring to the drawings there is shown in FIGURES 1 and 2, the cutting guide of the invention indicated generally at 10 comprising a one piece metal angle member used to guide a cutting tool to cut sheet material, as wallpaper, linearly along a corner. The guide 10 is a right angle member having a longitudinal guide flange 11 and a longitudinal holding flange 12. Flanges 11 and 12 are secured together in integral relation along adjacent sides with a corner section 13. An elongated longitudinal slot 14 extends along the corner of the corner section 13 over substantially the entire length of the corner section. The guide flange is marked with indicia (0 to 14 inches) to indicate the length of the holding flange 12. The slot 14 is spaced a short distance from each end of the corner section so that the end portions of the corner section secure the flanges 11 and 12 together. For example, the flanges are 14 inches long and the slot is 12 inches with a corner of one inch remaining at opposite ends of the guide.

Slot 14 extends from the inside to the outside corner of the corner section 13. As shown in FIGURE 2, the slot 14 is preferably at an angle of 45° with respect to the guide flange 11 and holding flange 12. Other angles of the slot 14 can be used to align the slot with the corners of the angle member. The slot 14 has a width which is slightly larger than the width of the cutting blade, such as a single edged razor blade. This minimizes the lateral deviation of the cutting knife and maintains a straight and clean cut of the sheet material.

Corner section 13 has a longitudinal outwardly directed rib 16 extended along the outside of slot 14 spacing the flange 12 from the wall. The outer end of flange 12 has an outwardly directed rib 17 which cooperates with the rib 16 to hold the angle member in alignment with the corner of a structure. The guide flange has flat substantially parallel faces for positioning the guide on a corner so that the slot 14 is linearly aligned with the corner.

Referring to FIGURE 4, there is shown a modified cutting guide indicated generally at 18 having a guide flange 19 and a holding flange 21 normally disposed with respect to each other. A corner section 22 integrally attaches the adjacent sides of the flanges providing a one piece guide. A longitudinal slot 23 extends longitudinally through the corner of the corner section 22. Slot 23 has a width which is slightly larger than the width of the knife of the cutting tool.

Corner section 22 has a longitudinal outside rib 24 extended along the slot 23 adjacent the base of the holding flange 21. The outer end of the holding flange 21 is an outwardly projected longitudinal rib 26. The ribs 24 and 26 localize the pressure of the guide on the sheet material in the corner of the structure. The inside of the corner section 22 has an inwardly directed longitudinal rib 27 extended along the inner opening of the slot 23. A rib 28 projects outwardly from the inside of the outer end of the holding flange 21. The ribs 27 and 28 hold the sheet material on an outside corner 22. Ribs 24 and 27 have flat outside faces to hold a band of sheet material adjacent the corner. This localized pressure on the sheet material prevents rippling and movement of the sheet material as it is cut.

FIGURE 7 shows a modified cutting guide 44 having a guide flange 46 and holding flange 47 joined together with a corner section 48. A longitudinal slot 49 extends along the corner section. Secured to the corner section adjacent the outside of slot 49 is an outwardly directed rib 51 of yieldable or resilient material, as rubber, foam rubber or plastic. This material will grip the sheet material and deform to compensate for any irregular shapes in the wall. A similar resilient rib 52 is secured to the inside of corner section 48 adjacent slot 49. The lower or outer end of the holding flange 47 has ribs similar to the ribs 26 and 28 shown in FIGURE 4.

In use, as shown in FIGURE 5, the cutting guide 10 is used in an inside corner 29 to cut sheet material 31, as wallpaper, vinyl covering, cloth covering or other wall covering material, linearly along the corner 32. The holding flange 12 is placed against the sheet material 31 with the ribs 16 and 17 localizing the pressure on the sheet material adjacent the corner 32. A cutting tool 33 having a flat knife 34, as the razor blade, is inserted through the slot 14 and moved longitudinally along the slot to cut the sheet material 31 linearly along the corner 32. The guide flange 11 functions to locate the cutting guide in the corner and serves as a linear guide for the knife 34.

Referring to FIGURE 6, there is shown the cutting guide on an outside corner 36 having a wall covered with sheet material 37. The flanges 11 and 12 positioned about the corner hold the sheet material 37 in firm engagement with the corner structure aligning the slot 14 with the corner ridge 38. A cutting tool 39 having a knife 41 is used to cut the sheet material 37 longitudinally at the corner 38. The knife 41 is guided in the slot 14 to accurately cut the sheet material.

FIGURE 4 shows in broken lines an outside corner 42 and the cutting guide 18 located on the corner 42. The ribs 27 and 28 are in firm engagement with the sheet material at the corner. The cutting knife 43 is used to cut the material along the corner rib.

While there have been shown and described preferred embodiments of the invention, it is to be understood that various changes, additions and substitution of materials may be made by those skilled in the art without departing from the spirit of the invention. For example, the cutting guide may be a one piece metal or plastic member and the ribs may be of various shapes to exert localized pressure on the sheet material adjacent the corner. The ribs may be of material other than the material of the flanges. Both the inner and outer sides of the holding flange may be provided with ribs as shown in FIGURE 5. The width and angle of the slot in the cutting guide may be varied according to the type of cutting tool. In addition, the angular relationship between the holding flange and the guide flange may be varied for other than right angles corners. The invention is defined in the following claims.

The embodiments of the invention in which an exclusive property or privilege is claimed are defined as follows:

1. A guide for a knife blade used to cut sheet material along a corner of a structure comprising: an elongated angle member having a guide flange, a holding flange angularly disposed with respect to the guide flange and a corner section connecting adjacent sides of said guide flange and holding flange, said corner section having an elongated longitudinal slot whereby when the angle member is placed on the corner of the structure the slot extends longitudinally of the corner so that when the knife blade is inserted into the slot and moved longitudinally thereof the sheet material is cut along the corner, said corner section having a first longitudinal rib extended adjacent the slot and along the holding flange, said holding flange having a second longitudinal rib laterally spaced from the first rib, the portion of the holding flange between the first rib and the second rib is spaced inwardly relative to the ribs so that when the first rib and the second rib engage the sheet material, said portion of the holding flange is out of contact with the sheet material.

2. The guide of claim 1 wherein said first longitudinal rib extends along the outside of said slot and holding flange and said second longitudinal rib extends along the outside of the outer edge of the holding flange.

3. The guide of claim 2 wherein said slot extends through the corner section at an angle of about 45° with respect to the holding flange.

4. The guide of claim 2 wherein the first rib is an elongated resilient member.

5. The guide of claim 1 wherein said corner section has the first longitudinal rib extended along the inside of the slot and holding flange and the second longitudinal rib extended along the inside of the outer edge of the holding flange.

6. The guide of claim 1 wherein said corner section has a first outside longitudinal rib extended along the slot and holding flange and a second outside longitudinal rib extended along the outside of the outer edge of the holding flange and said corner section having a first inside longitudinal rib extended along the slot and holding flange and a second inside longitudinal rib extended along the inside of the outer edge of the holding flange.

7. The guide of claim 6 wherein said slot extends through the corner section at an angle of about 45° with respect to the holding flange.

8. The guide of claim 6 wherein said guide flange has a flat inner surface and a flat outer surface.

9. The guide of claim 6 wherein the first outside rib and first inside rib are elongated resilient members.

10. The guide of claim 1 wherein said slot extends through the corner section at an angle of about 45° with respect to the holding flange and has a length substantially the length of the angle member.

11. The guide of claim 1 wherein said guide flange has a flat inner surface and a flat outer surface.

References Cited

UNITED STATES PATENTS

| 1,129,310 | 2/1915 | Platt | 30—293 |
| 2,414,408 | 1/1947 | Galazin | 30—289 |
| 3,349,486 | 10/1967 | Voight | 30—294 |

FOREIGN PATENTS

| 680,158 | 10/1952 | Great Britain. |

SAMUEL S. MATTHEWS, Primary Examiner

U.S. Cl. X.R.

30—289